US010329413B2

(12) United States Patent
Takamizu

(10) Patent No.: US 10,329,413 B2
(45) Date of Patent: Jun. 25, 2019

(54) VINYL CHLORIDE RESIN COMPOSITION

(71) Applicant: Kaneka Corporation, Osaka (JP)

(72) Inventor: Kenji Takamizu, Hyogo (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 15/829,444

(22) Filed: Dec. 1, 2017

(65) Prior Publication Data
US 2018/0086907 A1 Mar. 29, 2018

Related U.S. Application Data

(63) Continuation of application No. PCT/JP2016/066392, filed on Jun. 2, 2016.

(30) Foreign Application Priority Data

Jun. 4, 2015 (JP) ................. 2015-114227

(51) Int. Cl.
C08L 27/06 (2006.01)
C08L 25/12 (2006.01)
C08L 33/08 (2006.01)

(52) U.S. Cl.
CPC ............ C08L 27/06 (2013.01); C08L 25/12 (2013.01); C08L 33/08 (2013.01); C08L 2205/03 (2013.01); C08L 2205/06 (2013.01); C08L 2207/53 (2013.01)

(58) Field of Classification Search
CPC .......... C08L 25/12; C08L 27/06; C08L 33/08; C08L 2205/06; C08L 2205/03
See application file for complete search history.

(56) References Cited

U.S. PATENT DOCUMENTS

| | | | |
|---|---|---|---|
| 6,221,966 B1 | 4/2001 | Nakanishi et al. | |
| 6,730,741 B1 | 5/2004 | Honda et al. | |
| 2004/0039123 A1 | 2/2004 | Troy et al. | |
| 2005/0137341 A1* | 6/2005 | Hawrylko et al. | C08L 27/06 525/205 |
| 2005/0250880 A1 | 11/2005 | Troy et al. | |
| 2006/0111515 A1* | 5/2006 | Simmons et al. | C08L 25/12 525/191 |
| 2016/0333176 A1* | 11/2016 | Kim et al. | C08L 25/12 |

FOREIGN PATENT DOCUMENTS

| | | |
|---|---|---|
| CN | 104231483 A | 12/2014 |
| JP | H03-039347 A | 2/1991 |
| JP | H04-046944 A | 2/1992 |
| JP | H06-192535 A | 7/1994 |
| JP | H07-188492 A | 7/1995 |
| JP | H11-166091 A | 6/1999 |
| JP | 2001031826 A | 2/2001 |
| JP | 3379185 B2 | 2/2003 |
| JP | 2004131714 A | 4/2004 |
| JP | 2005314440 A | 11/2005 |
| JP | 3764258 B2 | 4/2006 |
| JP | 2012224839 A | 11/2012 |
| WO | 2014/133254 A1 | 9/2014 |

OTHER PUBLICATIONS

International Search Report issued in International Application No. PCT/JP2016/066392; dated Sep. 6, 2016 (2 pages).
Extended European Search Report issued in European Application No. 16803447.8, dated Oct. 26, 2018 (7 pages).

* cited by examiner

Primary Examiner — Nathan M Nutter
(74) Attorney, Agent, or Firm — Osha Liang LLP

(57) ABSTRACT

A vinyl chloride resin composition includes 100 parts by weight of a vinyl chloride resin (A) and 0.1 to 20 parts by weight of a processing aid (B), wherein the processing aid (B) includes 50 to 95% by weight of a first polymer (b1) and 5 to 50% by weight of a second polymer (b2) and has a weight average molecular weight of 100,000 to 4,000,000. The first polymer (b1) has Tg of 5 to 110° C. and is polymerized with 12 to 28 w % of a vinyl cyanide compound, 32 to 88 w % of an aromatic vinyl compound, 0 to 40 w % of an alkyl acrylate, and 0 to 30 w % of other vinyl compound copolymerizable with the vinyl cyanide compound, the aromatic vinyl compound, and the alkyl acrylate, per 100 w % of the first polymer (b1).

21 Claims, No Drawings

VINYL CHLORIDE RESIN COMPOSITION

TECHNICAL FIELD

One or more embodiments of the present invention relate to a vinyl chloride resin composition having excellent workability during a molding process, and excellent surface property and gloss of the molded product, and a molded product prepared therefrom.

BACKGROUND

A vinyl chloride resin has the disadvantage that the workability during the molding process becomes insufficient due to a high melting viscosity, a low fluidity, and an easy thermal decomposition in some cases.

This was overcome by carrying a method for expanding a range of a temperature capable of molding the composition by compounding a plasticizer to a vinyl chloride resin. However, in this method, the plasticizer compounded during hot molding is volatilized, the complete achievement of the original target becomes difficult, and the mechanical property of the molded product decreases.

In order to address the above deficiencies, in a method for using a processing aid containing a copolymer of methyl methacrylate as a main component, the time to mold a sheet and a film by calender molding or extrusion molding is shorten. However, a melt (gelation) of a resin contained in the processing aid is reduced, and a molding at a broad processing range of from a lower temperature to a high temperature becomes difficult.

On the other hand, Patent Document 1 discloses a processing aid containing as a main component a known acrylonitrile-styrene copolymer. However, the vinyl chloride resin composition containing acrylonitrile-styrene copolymer disclosed in Patent document 1 does not meet a satisfactory workability during the molding process. In addition, in the resin composition, the surface property and gloss may be deteriorated due to the fish eye generated on the surface of the molded product. Further, a given acrylonitrile-styrene copolymer does not have sufficient transparency and yellow index in some cases.

PATENT DOCUMENT

Patent Document 1: Japanese Patent No. 3764258

SUMMARY

One or more embodiments of the present invention provide a vinyl chloride resin composition having improved workability during the molding process, the surface property and the gloss of the molded product, and a molded product therefrom the same compared to a conventional vinyl chloride.

One or more embodiments of the present invention may provide a vinyl chloride resin composition having improved transparency and yellow index in addition to improved workability during the molding process, surface property and gloss of the molded product, and a molded product therefrom the same.

DETAILED DESCRIPTION OF THE EMBODIMENTS

The present inventors have found that the workability during the molding process from the promotion of the gelation rate, the surface property and gloss from the decrease of the fish eye are improved by mixing a vinyl chloride resin with a processing aid containing the first polymer and the second polymer, the first polymer having higher Tg (glass transition temperature) than that of the second polymer, and having a given weight average molecular weight, and properly dispersing the processing aid in the vinyl chloride resin.

Further, the present inventors have found that the transparency and the yellow index are improved in addition to the improvements such as the workability during the molding process, the surface property and gloss of the molded product, by using the processing aid containing the first polymer polymerized with an alkyl acrylate in a given amount.

That is, the gist of the present disclosure is as follows:

1) A vinyl chloride resin composition containing 100 parts by weight of a vinyl chloride resin (A) and 0.1 to 20 parts by weight of a processing aid (B), wherein the processing aid (B) contains 50 to 95% by weight of a first polymer (b1) and 5 to 50% by weight of a second polymer (b2), the processing aid (B) has a weight average molecular weight of 100,000 to 4,000,000, the first polymer (b1) of the processing aid (B) has Tg of 5 to 110° C., the first polymer (b1) of the processing aid (B) is polymerized with 12 to 28% by weight of a vinyl cyanide compound, 32 to 88% by weight of an aromatic vinyl compound, 0 to 40% by weight of an alkyl acrylate, and 0 to 30% by weight of other vinyl compound copolymerizable with the vinyl cyanide compound, the aromatic vinyl compound, and the alkyl acrylate, per 100% by weight of the first polymer (b1), the second polymer (b2) of the processing aid (B) has Tg of −40 to 50° C., and the first polymer (b1) has Tg of 40° C. or higher than that of the second polymer (b2).

2) The vinyl chloride resin composition according to the above 1), wherein the processing aid (B) has the weight average molecular weight of 500,000 to 2,000,000.

3) The vinyl chloride resin composition according to the above 1) or 2), wherein the second polymer (b2) of the processing aid (B) is polymerized with 30 to 90% by weight of an alkyl acrylate, 10 to 70% by weight of at least one vinyl compound selected from the group consisting of a vinyl cyanide compound, an aromatic vinyl compound, and an alkyl methacrylate, and 0 to 30% by weight of other vinyl compound copolymerizable with the alkyl acrylate, the vinyl cyanide compound, the aromatic vinyl compound, and the alkyl methacrylate, per 100% by weight of the second polymer (b2).

4) The vinyl chloride resin composition according to any one of the above 1) to 3), wherein the first polymer (b1) of the processing aid (B) has Tg of 50 to 105° C.

5) The vinyl chloride resin composition according to any one of the above 1) to 4), wherein the second polymer (b2) of the processing aid (B) has Tg of −20 to 30° C.

6) The vinyl chloride resin composition according to any one of the above 1) to 5), wherein the first polymer (b1) of the processing aid (B) is polymerized with 16 to 24% by weight of the vinyl cyanide compound, 56 to 84% by weight of the aromatic vinyl compound, 0 to 20% by weight of the alkyl acrylate, and 0 to 30% by weight of other vinyl compound copolymerizable with the vinyl cyanide compound, the aromatic vinyl compound, and the alkyl acrylate, per 100% by weight of the first polymer (b1).

7) The vinyl chloride resin composition according to any one of the above 1) to 6), wherein the processing aid (B) contains 70 to 90% by weight of the first polymer (b1) and 10 to 30% by weight of the second polymer (b2).

8) The vinyl chloride resin composition according to any one of the above 1) to 7), wherein the first polymer (b1) of the processing aid (B) has the weight average molecular weight of 600,000 to 2,000,000.

9) The vinyl chloride resin composition according to any one of the above 1) to 5), 7) and 8), wherein the first polymer (b1) of the processing aid (B) is polymerized with 12 to 28% by weight of the vinyl cyanide compound, 50 to 80% by weight of the aromatic vinyl compound, and 8 to 35% by weight of the alkyl acrylate, and 0 to 30% by weight of other vinyl compound copolymerizable with the vinyl cyanide compound, the aromatic vinyl compound, and the alkyl acrylate, per 100% by weight of the first polymer (b1).

10) A molded product obtained by molding the vinyl chloride resin composition as defined in any one of the above 1) to 9).

According to one or more embodiments of the present invention, the vinyl chloride resin composition having excellent workability during the molding process, the surface property and gloss of the molded product and a molded product therefrom can be provided.

According to one or more embodiments of the present invention, the transparency and gloss of the molded product can be improved.

<Vinyl Chloride Resin (A)>

In one or more embodiments of the present invention, the vinyl chloride resin (A) may have a structure of which one or more hydrogens contained in a monomer unit of polyolefin or polydiene are substituted with chlorine. The vinyl chloride resin (A) includes polyvinyl chloride, polychlorinated vinyl chloride, polyvinylidene chloride, chlorinated polyethylene, vinyl chloride and vinyl acetate copolymer, vinyl chloride ethylene copolymer, and chloroprene rubber. In one or more embodiments of the present invention, the vinyl chloride resin (A) may be polyvinyl chloride.

In one or more embodiments of the present invention, the vinyl chloride resin may have an average polymerization degree of 300 to 7000, or 400 to 3000.

<Processing Aid (B)>

According to one or more embodiments of the present invention, the processing aid contains at least a first polymer and a second polymer, and may contain a third polymer and the like in addition to the first polymer and the second polymer.

The first polymer may be polymerized with at least an aromatic vinyl compound and a vinyl cyanide compound, and may be polymer having higher Tg than Tg of the second polymer.

The second polymer may be polymerized with at least an alkyl acrylate and an aromatic vinyl compound, and may be polymer having lower Tg than Tg of the first polymer.

The third polymer and the like may be any of the first polymer and the second polymer, and may be those except the first polymer and the second polymer.

In one or more embodiments of the present invention, the processing aid may be consisting of the first polymer and the second polymer.

In one or more embodiments of the present invention, the processing aid (B) may contain 50 to 95% by weight of the first polymer (b1) and 5 to 50% by weight of the second polymer (b2), or 60 to 95% by weight of the first polymer (b1) and 5 to 40% by weight of the second polymer (b2), or 70 to 90% by weight of the first polymer (b1) and 10 to 30% by weight of the second polymer (b2), per 100% by weight of the first polymer (b1) and the second polymer (b2) in the viewpoint of the workability, the surface property, and the gloss. When the processing aid does not satisfy the above range, there is a tendency that many fish eyes are generated on the surface of the molded product and the gelation rate at the time of melting becomes slow.

<First Polymer (b1) of Processing Aid (B)>

In one or more embodiments of the present invention, the first polymer (b1) of the processing aid (B) may have Tg of 5 to 110° C. in the viewpoint of the improvement of the workability, the surface property and the gloss by giving high shearing to the vinyl chloride resin to decrease the melting viscosity of the resin, or 50 to 105° C., or 70 to 105° C. in the viewpoint of high gloss. When Tg is less than 5° C., the shearing needed in the decrease of the melting viscosity of the resin cannot be applied, there is a tendency to decrease a gloss. When Tg is more than 110° C., the dispersibility of the processing aid into the resin is deteriorated. In addition, in one or more embodiments of the present invention, the first polymer (b1) of the processing aid (B) may have Tg of 40 to 80° C. in the viewpoint of the transparency and the yellow index of the resin composition.

Tg may be calculated by obtaining Tg of each monomers based on Tg of a homopolymer described in Polymer Handbook Fourth Edition, J. Brand, Wiley, 1998. Also, Tg may be calculated with differential thermal analysis and differential scanning calorimetry.

In addition, in one or more embodiments of the present invention, the first polymer (b1) of the processing aid (B) may have Tg of 40° C. or higher, or Tg of 60° C. or higher, or Tg of 80° C. or higher than Tg of the second polymer (b2) in the viewpoint of the workability, the surface property, and the gloss. When Tg does not meet the above range, at least one of the fish eye, the gelation rate, and the gloss is not improved in some cases.

According to one or more embodiments of the present invention, the first polymer (b1) of the processing aid (B) may be polymerized with 12 to 28% by weight of a vinyl cyanide compound, 32 to 88% by weight of an aromatic vinyl compound, 0 to 40% by weight of an alkyl acrylate, and 0 to 30% by weight of other vinyl compound copolymerizable with the vinyl cyanide compound, the aromatic vinyl compound, and the alkyl acrylate, per 100% by weight of the first polymer (b1), in the viewpoint of the improvement of the workability, the surface property, and the gloss by control of the compatibilizing degree to the vinyl chloride resin.

In one or more embodiments of the present invention, the first polymer (b1) of the processing aid (B) may be polymerized with 16 to 24% by weight of a vinyl cyanide compound, 56 to 84% by weight of an aromatic vinyl compound, 0 to 20% by weight of an alkyl acrylate, and 0 to 30% by weight of other vinyl compound copolymerizable with the vinyl cyanide compound, the aromatic vinyl compound, and the alkyl acrylate, per 100% by weight of the first polymer (b1).

In one or more embodiments of the present invention, the first polymer (b1) of the processing aid (B) may be polymerized with 16 to 22% by weight of a vinyl cyanide compound, 58 to 84% by weight of an aromatic vinyl compound, 0 to 20% by weight of an alkyl acrylate, and 0 to 20% by weight of other vinyl compound copolymerizable with the vinyl cyanide compound, the aromatic vinyl compound, and the alkyl acrylate, per 100% by weight of the first polymer (b1). In the case where the first polymer of the processing aid does not satisfy the above range, the compatibility of the processing aid to the vinyl chloride resin and the dispersibility of the processing aid are deteriorated, and further all of the workability, the surface property, and the gloss are lowered.

In addition, according to one or more embodiments of the present invention, in the viewpoint of the transparency and the yellow index, the first polymer (b1) of the processing aid (B) may be polymerized with 12 to 28% by weight of a vinyl cyanide compound, 50 to 80% by weight of an aromatic vinyl compound, 8 to 35% by weight of an alkyl acrylate, and 0 to 30% by weight of other vinyl compound copolymerizable with the vinyl cyanide compound, the aromatic vinyl compound, the alkyl acrylate, per 100% by weight of the first polymer.

In one or more embodiments of the present invention, the first polymer (b1) of the processing aid (B) may be polymerized with 12 to 28% by weight of a vinyl cyanide compound, 55 to 80% by weight of an aromatic vinyl compound, 8 to 30% by weight of an alkyl acrylate, and 0 to 30% by weight of other vinyl compound copolymerizable with the vinyl cyanide compound, the aromatic vinyl compound, the alkyl acrylate, per 100% by weight of the first polymer.

In yet another embodiment of the present invention, the first polymer (b1) of the processing aid (B) may be polymerized with 12 to 28% by weight of a vinyl cyanide compound, 60 to 80% by weight of an aromatic vinyl compound, 8 to 20% by weight of an alkyl acrylate, and 0 to 20% by weight of other vinyl compound copolymerizable with the vinyl cyanide compound, the aromatic vinyl compound, the alkyl acrylate, per 100% by weight of the first polymer.

The vinyl cyanide compound used in the first polymer (b1) of the processing aid (B) includes acrylonitrile, methacrylonitrile, and the like. The vinyl cyanide compound may be acrylonitrile in the viewpoint of the workability, the surface property, and the gloss. The vinyl cyanide compound can be used individually or in the combination of two or more vinyl cyanide compounds.

The aromatic vinyl compound used in the first polymer (b1) of the processing aid (B) includes styrene, alpha-methylstyrene, p-methylstyrene, monobromostyrene, dibromostyrene, tribromostyrene, chlorostyrene, and the like. The aromatic vinyl compound may be styrene in the viewpoint of the workability, the surface property, and the gloss. The aromatic vinyl compound can be used individually or in the combination of two or more aromatic vinyl compounds.

The alkyl acrylate used in the first polymer (b1) of the processing aid (B) includes linear alkyl acrylates having 1 to 20 of a carbon atom such as methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate; branched alkyl acrylates having 1 to 20 of a carbon atom such as isopropyl acrylate, isobutyl acrylate, s-butyl acrylate, t-butyl acrylate, isopentyl acrylate, 2-ethylhexyl acrylate, isooctyl acrylate, isononyl acrylate, isodecyl acrylate, isoundecyl acrylate, isododecyl acrylate, isotridecyl acrylate, isotetradecyl acrylate, isopentadecyl acrylate, isohexadecyl acrylate, isoheptadecyl acrylate, isooctadecyl acrylate; cyclic alkyl acrylates having 3 to 20 of carbon atoms such as cyclopropyl acrylate, cyclobutyl acrylate, cyclopentyl acrylate, cyclohexyl acrylate, cyclooctyl acrylate, cyclodecyl acrylate.

The alkyl acrylate may have a carbon atom of 1 to 14, or 1 to 12, or 1 to 10, or 1 to 8, or 1 to 6.

The alkyl acrylate may be ethyl acrylate, propyl acrylate, butyl acrylate, 2-ethylhexyl acrylate, or butyl acrylate in the viewpoint of the workability, the surface property, and the gloss. The alkyl acrylate can be used individually or in the combination of two or more alkyl acrylates.

The other vinyl compound copolymerizable with the vinyl cyanide compound, the aromatic vinyl compound, and the alkyl acrylate, which is used in the first polymer (b1) of the processing aid (B), includes linear alkyl methacrylates having 1 to 20 of a carbon atom such as methyl methacrylate, ethyl methacrylate, propyl methacrylate, butyl methacrylate, pentyl methacrylate, hexyl methacrylate, heptyl methacrylate, octyl methacrylate, nonyl methacrylate, decyl methacrylate, undecyl methacrylate, dodecyl methacrylate, tridecyl methacrylate, tetradecyl methacrylate, pentadecyl methacrylate, hexadecyl methacrylate, octadecyl methacrylate; branched alkyl methacrylate having 1 to 20 of a carbon atom such as isopropyl methacrylate, isobutyl methacrylate, s-butyl methacrylate, t-butyl methacrylate, isopentyl methacrylate, 2-ethylhexyl methacrylate, isooctyl methacrylate, isononyl methacrylate, isodecyl methacrylate, isoundecyl methacrylate, isododecyl methacrylate, isotridecyl methacrylate, isotetradecyl methacrylate, isopentadecyl methacrylate, isohexadecyl methacrylate, isoheptadecyl methacrylate, isooctadecyl methacrylate; cyclic alkyl methacrylates having 3 to 20 of carbon atoms such as cyclopropyl methacrylate, cyclobutyl methacrylate, cyclopentyl methacrylate, cyclohexyl methacrylate, cyclooctyl methacrylate, cyclodecyl methacrylate; aryl methacrylates such as phenyl methacrylate, methyl phenyl methacrylate; aralkyl methacrylate such as benzyl methacrylate; unsaturated acid anhydrides such as maleic acid anhydride, itaconic acid anhydride, citraconic acid anhydride; unsaturated acids such as acrylic acid, methacrylic acid, imide compounds of $\alpha,\beta$-unsaturated dicarboxylic acid such as maleimide, N-methyl maleimide, N-butyl maleimide, N-(p-methylphenyl)maleimide, N-phenyl maleimide, N-cyclohexyl maleimide; epoxy group-containing unsaturated compounds such as glycidyl methacrylate, allylglycidyl ether, unsaturated carboxylic acid amides such as acrylamide, methacrylamide; amino group-containing unsaturated compounds such as acrylamine, aminomethyl methacrylate, aminoether methacrylate, aminopropyl methacrylate, aminostyrene; hydroxyl group-containing unsaturated compounds such as 3-hydroxy-1-propene, 4-hydroxy-1-butene, cis-4-hydroxy-2-butene, trans-4-hydroxy-2-butene, 3-hydroxy-2-methyl-1-propene, 2-hydroxylethylacrylate, 2-hydroxyethylmethacrylate, hydroxystyrene, oxazoline group-containing unsaturated compounds such as vinyl oxazoline, and the like.

Among these, the other vinyl compound may contain no compound having multiple functional groups, or may contain a linear alkyl methacrylate, a branched alkyl methacrylate, or a cyclic alkyl methacrylate, or a linear alkyl methacrylate, or methyl methacrylate, ethyl methacrylate. The other vinyl compound can be used individually or in the combination of two or more other vinyl compounds.

In one or more embodiments of the present invention, the first polymer (b1) of the processing aid (B) may have a weight average molecular weight (Mw) of 150,000 to 4,000,000 in the viewpoint of the improvement of the dispersibility to the vinyl chloride resin, the decrease of a melting viscosity of the vinyl chloride resin, and the improvement of the workability, the surface property, and the gloss. In one or more embodiments of the present invention, the first polymer (b1) of the processing aid (B) may have a weight average molecular weight (Mw) of 400,000 to 2,000,000, or 300,000 to 2,000,000, or 600,000 to 2,000,000, or 600,000 to 1,500,000 in the viewpoint of the workability and the gloss. In the case of the weight average molecular weight of less than 150,000, the shearing is not carried out in order to decrease a melting viscosity of the resin. In the case of the weight average molecular weight of more than 4,000,000, the dispersibility to the resin becomes insufficient, and all of the workability, the surface property, and the gloss is deteriorated.

<Second Polymer (b2) of Processing Aid (B)>

In one or more embodiments of the present invention, the second polymer (b2) of the processing aid (B) may have Tg of −40 to 50° C. in the viewpoint of high dispersibility of the processing aid to the vinyl chloride resin and the improvement of the workability, the surface property, and the gloss, or Tg of −30 to 40° C. in the viewpoint of the workability, or −20 to 30° C. in the viewpoint of the gloss. When Tg does not meet the above range, the dispersibility of the processing aid to the vinyl chloride resin becomes insufficient, and all of the workability, the surface property, and the gloss are deteriorated.

In one or more embodiments of the present invention, the second polymer (b2) of the processing aid (B) may be polymerized with 30 to 90% by weight of an alkyl acrylate, 10 to 70% by weight of at least one vinyl compound selected from the group consisting of a vinyl cyanide compound, an aromatic vinyl compound, and an alkyl methacrylate, and 0 to 30% by weight of other vinyl compound copolymerizable with the vinyl cyanide compound, the aromatic vinyl compound, the alkyl acrylate, and the alkyl methacrylate, per 100% by weight of the second polymer (b2), in the viewpoint of the improvement of the dispersibility of the processing aid to the vinyl chloride resin and the improvement of the workability, the surface property, and the gloss.

In one or more embodiments of the present invention, the second polymer (b2) of the processing aid (B) may be polymerized with 40 to 70% by weight of an alkyl acrylate, 30 to 60% by weight of at least one vinyl compound selected from the group consisting of a vinyl cyanide compound, an aromatic vinyl compound, and an alkyl methacrylate, and 0 to 30% by weight of other vinyl compound copolymerizable with the vinyl cyanide compound, the aromatic vinyl compound, the alkyl acrylate, and the alkyl methacrylate, per 100% by weight of the second polymer (b2) in the viewpoint of the surface property and the gloss.

In one or more embodiments of the present invention, the second polymer (b2) of the processing aid (B) may be polymerized with 50 to 70% by weight of an alkyl acrylate, 30 to 50% by weight of at least one vinyl compound selected from the group consisting of a vinyl cyanide compound, an aromatic vinyl compound, and an alkyl methacrylate, and 0 to 30% by weight of other vinyl compound copolymerizable with the vinyl cyanide compound, the aromatic vinyl compound, the alkyl acrylate, and the alkyl methacrylate, per 100% by weight of the second polymer (b2).

In the case where the second polymer of the processing aid does not satisfy the above range, the compatibility of the processing aid to the vinyl chloride resin and the dispersibility of the processing aid are deteriorated, and further all of the workability, the surface property, and the gloss are lowered.

The alkyl acrylate used in the second polymer (b2) of the processing aid (B) may be the same as those exemplified in the first polymer (b1), and includes linear alkyl acrylates having 1 to 20 of a carbon atom such as methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate; branched alkyl acrylates having 1 to 20 of a carbon atom such as isopropyl acrylate, isobutyl acrylate, s-butyl acrylate, t-butyl acrylate, isopentyl acrylate, 2-ethylhexyl acrylate, isooctyl acylate, isononyl acrylate, isodecyl acrylate, isoundecyl acrylate, isododecyl acrylate, isotridecyl acrylate, isotetradecyl acrylate, isopentadecyl acrylate, isohexadecyl acrylate, isoheptadecyl acrylate, isooctadecyl acrylate; cyclic alkyl acrylates having 3 to 20 of carbon atoms such as cyclopropyl acrylate, cyclobutyl acrylate, cyclopentyl acrylate, cyclohexyl acrylate, cyclooctyl acrylate, cyclodecyl acrylate.

The alkyl acrylate may have a carbon atom of 1 to 14, or 1 to 12, or 1 to 10, or 1 to 8, or 2 to 6.

The alkyl acrylate may be ethyl acrylate, propyl acrylate, butyl acrylate, 2-ethylhexyl acrylate, or butyl acrylate in the viewpoint of the workability, the surface property, and the gloss. The alkyl acrylate can be used individually or in the combination of two or more alkyl acrylates.

The vinyl cyanide compound used in the second polymer (b2) of the processing aid (B) may be the same as those exemplified in the first polymer (b1), and includes acrylonitrile, methacrylonitrile, and the like. The vinyl cyanide compound used in the second polymer (b2) of the processing aid (B) may be acrylonitrile in the viewpoint of the workability, the surface property, and the gloss. The vinyl cyanide compound can be used individually or in the combination of two or more vinyl cyanide compounds.

The aromatic vinyl compound used in the second polymer (b2) of the processing aid (B) may be the same as those exemplified in the first polymer (b1), and includes styrene, alpha-methylstyrene, p-methylstyrene, monobromostyrene, dibromostyrene, tribromostyrene, chlorostyrene, and the like. The aromatic vinyl compound may be styrene in the viewpoint of the workability, the surface property, and the gloss. The aromatic vinyl compound can be used individually or in the combination of two or more aromatic vinyl compounds.

The alkyl methacrylate used in the second polymer (b2) of the processing aid (B) may be the same as those exemplified in the first polymer (b1), and includes linear alkyl methacrylates having 1 to 20 of a carbon atom such as methyl methacrylate, ethyl methacrylate, propyl methacrylate, butyl methacrylate, pentyl methacrylate, hexyl methacrylate, heptyl methacrylate, octyl methacrylate, nonyl methacrylate, decyl methacrylate, undecyl methacrylate, dodecyl methacrylate, tridecyl methacrylate, tetradecyl methacrylate, pentadecyl methacrylate, hexadecyl methacylate, octadecyl methacrylate; branched alkyl methacrylate having 1 to 20 of a carbon atom such as isopropyl methacrylate, isobutyl methacrylate, s-butyl methacrylate, t-butyl methacrylate, isopentyl methacrylate, 2-ethylhexyl methacrylate, isooctyl methacrylate, isononyl methacrylate, isodecyl methacrylate, isoundecyl methacrylate, isododecyl methacrylate, isotridecyl methacrylate, isotetradecyl methacrylate, isopentadecyl methacrylate, isohexadecyl methacylate, isoheptadecyl methacrylate, isooctadecyl methacrylate; cyclic alkyl methacrylates having 3 to 20 of carbon atoms such as cyclopropyl methacrylate, cyclobutyl methacrylate, cyclopentyl methacrylate, cyclohexyl methacrylate, cyclooctyl methacrylate, cyclodecyl methacrylate. The alkyl methacrylate may be methyl methacrylate, ethyl methacrylate, butyl methacrylate, or methyl methacrylate, butyl methacrylate, or methyl methacrylate in the viewpoint of the workability, the surface property, and the gloss. The alkyl methacrylate can be used individually or in the combination of two or more alkyl methacrylates.

The other vinyl compound copolymerizable with the vinyl cyanide compound, the aromatic vinyl compound, the alkyl acrylate, and the alkyl methacrylate includes unsaturated acid anhydrides such as maleic acid anhydride, itaconic acid anhydride, citraconic acid anhydride; unsaturated acids such as acrylic acid, methacrylic acid, imide compounds of α,β-unsaturated dicarboxylic acid such as maleimide, N-methyl maleimide, N-butyl maleimide, N-(p-methylphenyl)maleimide, N-phenyl maleimide, N-cyclohexyl maleimide; epoxy group-containing unsaturated compounds such as glycidyl methacrylate, allylglycidyl ether, unsaturated carboxylic acid amides such as acrylamide, methacrylamide; amino group-containing unsaturated compounds such as acrylamine, aminomethyl methacrylate, aminoether methacrylate, aminopropyl methacrylate, aminostyrene; hydroxyl group-containing unsaturated compounds such as 3-hydroxy-1-propene, 4-hydroxy-1-butene, cis-4-hydroxy-2-butene, trans-4-hydroxy-2-butene, 3-hydroxy-2-methyl-1-propene, 2-hydroxyethylacrylate, 2-hydroxyethylmethacrylate, hydroxystyrene; oxazoline group-containing unsaturated compounds such as vinyl oxazoline, and the like. The other vinyl compound can be used individually or in the combination of two or more other vinyl compounds.

According to one or more embodiments of the present invention, in the processing aid, the first polymer (b1) may not be chemically bonded with the second polymer (b2), and the first polymer (b1) and the second polymer (b2) are independently present in one particle. It is also envisioned that the second polymer (b2) may be present outside the first polymer (b1) in one particle. The structure of the processing aid in the vinyl chloride resin is not limited particularly, and may be a granulate structure or a linear structure.

According to one or more embodiments of the present invention, the processing aid (B) may have a weight average molecular weight (Mw) of 100,000 to 4,000,000 in the viewpoint of the improvement of the dispersibility to the vinyl chloride resin, the decrease of the melting viscosity of the vinyl chloride resin, and the improvement of the workability, the surface property, and the gloss. The processing aid (B) may have a weight average molecular weight (Mw) of 300,000 to 2,000,000, or 500,000 to 2,000,000, or 500,000 to 1,500,000 in the viewpoint of the workability and the gloss. In the case of the weight average molecular weight of less than 100,000, the shearing is not carried out in order to decrease the melting viscosity of the resin. In the case of the weight average molecular weight of more than 4,000,000, the dispersibility to the resin becomes insufficient, and all of the workability, the surface property, and the gloss is deteriorated.

The weight average molecular weight can be measured by dissolving a prepared processing aid in tetrahydrofuran, and subjecting a portion dissolved in tetrahydrofuran to gel permeation chromatography (sample solution: sample 20 mg/THF 10 mL, measurement temperature: 25° C., detector: differential refractometer, injected volume: 1 mL) based on polystyrene.

According to one or more embodiments of the present invention, the polymerization method for preparing the processing aid (B) may be a polymerization method of using water as medium such as an emulsion polymerization, suspension polymerization in the viewpoint of the ease recovery of the processing aid (B), low odor of the polymer, the handling, anti-blocking property, and the economy, or an emulsion polymerization in the viewpoint of the dispersibility of the processing aid to the vinyl chloride resin. Further, in one or more embodiments of the present invention, the polymerization method used to prepare the processing aid having two or more polymeric structures may be selected from emulsion polymerization, soap-free emulsion polymerization, or dropping suspension polymerization, in which a particle structure can be prepared.

According to one or more embodiments of the present invention, emulsifiers used in emulsion polymerization of the processing aid (B) may be conventionally known, and may include an anionic emulsifier, a cationic emulsifier, or a nonionic emulsifier. For example, anionic emulsifiers such as fatty acid salt, alkyl sulfate ester salt, alkyl benzene sulfonic acid salt, alkyl phosphoric acid ester salt, sulfosuccinic acid diester salt, a cationic emulsifier such as alkyl amine salt, nonionic emulsifiers such as polyoxyethylene-alkyl ether, polyoxyethylene fatty acid ester, and the like. Among these, the emulsifier may be an anionic emulsifier, or alkyl benzene sulfonic acid salt, or sodium dodecyl benzene sulfonate in the viewpoint of the polymerizing stability. The emulsifier can be used individually or in the combination of two or more emulsifiers as necessary.

According to one or more embodiments of the present invention, the weight average molecular weight of the processing aid can be controlled by modifying a monomer ratio of the first polymer and the second polymer as mentioned above. In addition, the weight average molecular weight of the processing aid can be controlled by modifying the usage amount of a radical polymerization initiator and if necessary a chain transfer agent, a temperature of polymerization, time of polymerization, and the like.

According to one or more embodiments of the present invention, as the radical polymerization initiator used in the emulsion polymerization of the processing aid (B), a redox initiator containing a oxidant of organic hydroperoxides such as t-butyl hydroperoxide, cumene hydroperoxide, diisopropyl benzene hydroperoxide, paramenthane hydroperoxide, t-butyl peroxylaurate, and reducing agents such as sulfite, bisulfite, thiosulfate, first row transition metal salt, sodium formaldehyde sulfoxylate; persulfates such as potassium persulfate, ammonium persulfate; azo compounds such as azobisisobutyronitrile, dimethyl-2,2'-azobisisobutylate, 2-carbamoyl-aza-isobutyronitrile; organic peroxides such as benzoyl peroxide, lauroyl peroxide and the like may be used. In one or more embodiments of the present invention, the radical polymerization initiator may be selected from organic hydroperoxides, or t-butyl hydroperoxide.

An amount of the radical polymerization initiator may be, for example, 0.0001 to 1.0 part by weight, or 0.0005 to 0.5 parts by weight, or 0.001 to 0.1 parts by weight per 100 parts by weight of used monomers. The amount of the radical polymerization initiator may be an amount of the radical polymerization initiator at the time of polymerization of the first polymer. When the amount of the radical polymerization initiator is large, there is a tendency to decrease a weight average molecular weight. Also, when the amount of the radical polymerization initiator is small, there is a tendency to increase a weight average molecular weight.

In one or more embodiments of the present invention, the chain transfer agent used in the emulsion polymerization of the processing aid (B) may include mercaptans such as octylmercaptan, n-dodecylmercaptan, t-dodecylmercaptan, n-hexylmercaptan, n-hexadecylmercaptan, n-tetradecylmercaptan, t-tetradecylmercaptan; hydrocarbons such as tetraethylthiuram disulfide, carbon tetrachloride, bromoethylene, pentanephenylethane; terpenes; acrolein, methacrolein, allylalcohol, 2-ethylhexylthioglycol, alpha-methylsyrene dimer or the like. In one or more embodiments of the present invention, the chain transfer agent may be selected from the group of mercaptans, or t-dodecylmercaptan. The chain transfer agent can be used individually or in the combination of two or more chain transfer agents.

An amount of the chain transfer agent is 0 to 1 part by weight per 100 parts by weight of the total monomers. In one or more embodiments of the present invention, the amount of the chain transfer agent may be an amount of the chain transfer agent at the polymerization of the first polymer. When the chain transfer agent is used, an amount of the chain transfer agent may be, for example, 0.001 to 3 parts by weight, or 0.01 to 1 part by weight, or 0.05 to 0.5 parts by weight. If the amount of the chain transfer agent is large, the gloss is lowered in some cases.

The time of polymerization may be modified according to monomers, an emulsifier, a radical polymerization initiator, and if necessary a chain transfer agent and amounts thereof. The time of polymerization is, for example, 1 hour to 50 hours or 5 hours to 24 hours.

The temperature of the polymerization may be modified according to monomers, an emulsifier, a radical polymerization initiator, and if necessary a chain transfer agent and amounts thereof. The temperature of the polymerization may be, for example, 10 to 90° C., or 30 to 70° C.

The processing aid (B) of the latex has a volume average particle diameter of from 0.100 μm to 0.500 μm. The volume average particle diameter can be calculated with a particle size analyzer (manufactured by Nikkiso Co., Ltd., Nanotracwave).

Then, the latex containing the resultant processing aid may be powdered using a coagulation method and the like.

According to one or more embodiments of the present invention, when the processing aid (B) is powdered, a method for coagulating a latex obtained by the emulsion polymerization with a salt coagulating agent such as inorganic salts, or divalent inorganic salts, or chloride calcium or an acid coagulating agent such as acids, a method for preparing powder of the processing aid (B) by subjecting the latex to spray drying and the like may be used.

After coagulation, the processing aid as described herein may be prepared by carrying out heat treatment, dehydration, washing, drying and the like.

<Vinyl Chloride Resin Composition>

In one or more embodiments of the present invention, a vinyl chloride resin composition may contain 100 parts by weight of the vinyl chloride resin (A), and 0.1 to 20 parts by weight of the processing aid (B). An amount of the processing aid (B) may be 0.2 to 18 parts by weight, or 0.5 to 15 parts by weight, or 1 to 12 parts by weight, per 100 parts by weight of the vinyl chloride resin (A).

When an amount of the processing aid is large, the dispersibility of the processing aid to the vinyl chloride resin is lowered in some cases.

If necessary, impact modifiers, stabilizing agents, lubricants, plasticizers, coloring agents, fillers, foaming agents and the like may be added to the vinyl chloride resin composition as described herein.

The vinyl chloride resin composition may be kneaded at 100 to 200° C. by mixing each components, and using kneader such as banbury mixer, kneader, roll, ribbon blender, Henschel mixer and the like. Further, kneaded vinyl chloride resin composition may be molded in an appropriate shape using extrusion molding, blow molding, injection molding, calender molding, and vacuum molding and the like.

A molded product obtained by molding the vinyl chloride resin composition is encompassed in one or more embodiments of the present invention.

The number of the fish eye on the surface of the molded product may be 400 or less/25 $cm^2$, or 200 or less/25 $cm^2$, or 100 or less/25 $cm^2$, or 50 or less/25 $cm^2$, or 20 or less/25 $cm^2$.

The lower limit of the number of the fish eye on the surface of the molded product may be, for example, 0/25 $cm^2$.

The fish eye can be defined as a foreign matter having a circular shape and an oval shape found in the surface of the molded product of the vinyl chloride resin composition, and having a size of maximum length L of 50 μm or more.

Condition for calculating the number of the fish eye is as follows.

100 parts by weight of a vinyl chloride resin, 1 to 15 parts by weight of a processing aid, 10 to 100 parts by weight of a plasticizer, 1 to 5 parts by weight of Ba/Zn stabilizer, 0.1 to 3 parts by weight of a lubricant, 0.1 to 3 parts by weight of titanium oxide, and 0.01 to 0.1 parts by weight of carbon black are mixed at a state of powder to prepare a mixture. The mixture is kneaded at 150 to 200° C. for 10 seconds to 5 minutes using 8 inch test roll at a rotation of 10 to 30 rpm, and the number of the fish eye may be visually counted per an area of 5 cm×5 cm of the molded product.

A gelation rate as measured in the following method may be, for example, 2 minutes 15 second or less, or 2 minutes 0 seconds or less, or 1 minute 55 seconds or less or 1 minute 50 seconds or less.

When the gelation rate is beyond the above value, the molding of a wide processing range of from a lower temperature to a high temperature becomes difficult in some cases.

The gelation rate can be determined by counting time to indicate a constant state of torque using a knead and extrude test evaluation device (manufactured by Toyo Seiki Seisakusho Ltd., LABO PLASTOMILL) under conditions of a rotation speed of 30 rpm, a temperature of 150° C., and 60 g of the vinyl chloride resin composition.

A molded product of the vinyl chloride resin composition may have a haze at 23° C. of for example, 13.0% or less, or 1.0% or less, or 10.0% or less, or 8.0% or less. Haze can be evaluated according to JIS K 7136 "Plastics-Determination of haze for transparent materials".

Total light transmittance at 23° C. of the molded product of the vinyl chloride resin composition may be, for example, 71% or more, or 75% or more, or 80% or more, or 85% or more. Total light transmittance can be evaluated according to JIS K 7375 "Plastics-Determination of total luminous light transmittance and reflectance".

Yellow index (YI) at 23° C. of the molded product of the vinyl chloride resin composition may be, for example, 30 or less, or 27 or less, or 25 or less. YI can be calculated according to JIS K 7373 "Plastics-Determination of yellowness index and change of yellowness".

In one or more embodiments of the present invention, the vinyl chloride resin composition may be suitably used for building materials such as wall materials, floor materials, window frames, corrugated sheets; interior and exterior materials for automobile; packing, gasket, hose, pipe, joint, sheet, electrical wire, cable and the like due to the improvements of the workability during molding process, the surface property and the gloss (such as transparency and color tone (yellow index)).

The present application claims the benefit of priority to Japanese Patent Application Number 2015-114227 filed on Jun. 4, 2015. The entire contents of the specification of Japanese Patent Application Number 2015-114227 filed on Jun. 4, 2015 are hereby incorporated by reference.

EXAMPLES

Next, one or more embodiments of the present invention will be described in detail with reference to Examples, but the present invention is not limited thereto.

First, each of measurement methods and evaluation methods is shown below.

<Measurement of Weight Average Molecular Weight of Processing Aid (B)>

A processing aid (B) was dissolved in tetrahydrofuran (THF) to prepare a soluble part, and a weight average molecular weight of the processing aid (B) was measured by subjecting the soluble part to gel permeation chromatography (manufactured by Tosoh Corporation, HLC-8220GPC) based on polystyrene (sample solution: sample 20 mg/THF 10 mL, measurement temperature: 25° C., detector: differential refractometer, injection volume: 1 mL).

<Measurement of Particles Diameter of Processing Aid (B)>

A volume average particle diameter of the particles of the processing aid (B) was measured using particle size analyzer (manufactured by Nikkiso Co., Ltd., Nanotracwave) at a wavelength of 546 nm as light scattering. A sample was used in a latex state containing the processing aid (B).

<Haze>

Haze of the molded product of the vinyl chloride resin composition was measured as an index of transparency.

To 100 parts by weight of a vinyl chloride resin (A) (manufactured by Kaneka Corporation, product name: Kanevinyl (registered trademark) S-1008, average polymerization degree of 800), 3 parts by weight of a processing aid (B), 1.0 part by weight of a butyl tin mercapto stabilizer (manufactured by NITTO KASEI CO., LTD.: TVS #1380), 0.5 parts by weight of an internal lubricant (manufactured by Emery Oleo Chemicals, product name: GH4), and 0.4 parts by weight of an external lubricant (manufactured by Emery Oleo Chemicals, product name: G70S) were mixed in a state of powder. A resultant mixture was kneaded using 8 inch test roll (manufactured by KANSAI ROLL Co. Ltd., test roll) under conditions of a rotation speed of 17 rpm at a temperature of 165° C. for 5 minutes, and a resultant kneaded product was pressed and molded with a press at 180° C. for 15 minutes to prepare a pressed plate having a thickness of 1.0 mm. Then, a test piece for evaluating the transparency having a thickness of 5.0 mm, a length of 30 mm, a width of 40 mm was made from the pressed plate. As an index of the transparency, haze at 23° C. was measured according to JIS K 7136 "Plastics-Determination of haze for transparent materials" using the obtained test piece.

<Total Light Transmittance>

As an index of the transparency, the total light transmittance of the molded product of the vinyl chloride resin composition was measured.

To 100 parts by weight of a vinyl chloride resin (A) (manufactured by Kaneka Corporation, product name: Kanevinyl (registered trademark) S-1008, average polymerization degree of 800), 3 parts by weight of a processing aid (B), 1.0 part by weight of a butyl tin mercapto stabilizer (manufactured by NITTO KASEI CO., LTD.: TVS #1380), 0.5 parts by weight of an internal lubricant (manufactured by Emery Oleo Chemicals, product name: GH4), and 0.4 parts by weight of an external lubricant (manufactured by Emery Oleo Chemicals, product name: G70S) were mixed in a state of powder. A resultant mixture was kneaded using 8 inch test roll (manufactured by KANSAI ROLL Co. Ltd., test roll) under conditions of a rotation speed of 17 rpm at a temperature of 165° C. for 5 minutes, and a resultant kneaded product was pressed and molded with a press at 180° C. for 15 minutes to prepare a pressed plate having a thickness of 1.0 mm. Then, a test piece for evaluating the transparency having a thickness of 5.0 mm, a length of 30 mm, a width of 40 mm was made from the pressed plate. As an index of the transparency at 23° C., a total light transmittance was measured according to JIS K 7375 "Plastics-Determination of total luminous transmittance and reflectance" using the obtained test piece.

<Yellowness (Yellow Index, YI)>

Yellowness (YI) of the molded product of the vinyl chloride resin composition was measured.

To 100 parts by weight of a vinyl chloride resin (A) (manufactured by Kaneka Corporation, product name: Kanevinyl (registered trademark) S-1008, average polymerization degree of 800), 3 parts by weight of a processing aid (B), 1.0 part by weight of a butyl tin mercapto stabilizer (manufactured by NITTO KASEI CO., LTD.: TVS #1380), 0.5 parts by weight of an internal lubricant (manufactured by Emery Oleo Chemicals, product name: GH4), and 0.4 parts by weight of an external lubricant (manufactured by Emery Oleo Chemicals, product name: G70S) were mixed in a state of powder. A resultant mixture was kneaded using 8 inch test roll (manufactured by KANSAI ROLL Co. Ltd., test roll) under conditions of a rotation speed of 17 rpm at a temperature of 165° C. for 5 minutes, and a resultant kneaded product was pressed and molded with a press at 180° C. for 15 minutes to prepare a pressed plate having a thickness of 1.0 mm. Then, a test piece for evaluating the yellowness having a thickness of 5.0 mm, a length of 30 mm, a width of 40 mm was made from the pressed plate. The yellowness at 23° C. was measured according to JIS K 7373 "Plastic-method for measuring yellowness and degree of yellowness" using the obtained test piece.

<Number of Fish Eye>

As an index of the surface property, the number of the fish eye on a molded product of the vinyl chloride resin composition was measured.

To 100 parts by weight of a vinyl chloride resin (A) (manufactured by Kaneka Corporation, product name: Kanevinyl (registered trademark) S-1008, average polymerization degree of 800), 10 parts by weight of a processing aid (B), 50 parts by weight of a plasticizer (manufactured by J-PLUS Co., Ltd.: DOP), 3.0 parts by weight of Ba/Zn stabilizer (manufactured by ADEKA Corporation: AC-186), 0.5 parts by weight of a lubricant (manufactured by SAKAI CHEMICAL INDUSTRY Co., Ltd: H-St), and 0.4 parts by weight of titanium oxide (manufactured by SAKAI CHEMICAL INDUSTRY Co., Ltd: R-62N), and 0.02 parts by weight of carbon black (manufactured by Tokai Carbon Co., Ltd: SEAST 3H) were mixed in a state of powder. A resultant mixture was kneaded using 8 inch test roll (manufactured by KANSAI ROLL Co. Ltd., test roll) under conditions of a rotation speed of 18 rpm at a temperature of 170° C. for 1 minute, to prepare a molded product. The number of the fish eye per an area of 5 cm×5 cm or a given area of the molded product was visually counted to calculate the number of the fish eye per an area of 5 cm×5 cm of the molded product. The fish eye is defined as a foreign material having a spherical shape or an oval shape in which the processing aid is aggregated in the vinyl chloride resin without dispersing and a maximum length L is 50 μm or more.

<Gelation Rate>

As an index of the workability, the gelation rate at the time of kneading the vinyl chloride resin composition was measured.

To 100 parts by weight of a vinyl chloride resin (A) (manufactured by Kaneka Corporation, product name: Kanevinyl (registered trademark) S-1008, average polymerization degree of 800), 10 parts by weight of a processing aid (B), 1.0 part by weight of a butyl tin mercapto stabilizer (manufactured by NITTO KASEI CO., LTD.: TVS #1380), 0.5 parts by weight of an internal lubricant (manufactured by Emery Oleo Chemicals, product name: GH4), and 0.4 parts by weight of an external lubricant (manufactured by Emery Oleo Chemicals, product name: G70S) were mixed in a state of powder. The gelation rate can be determined by counting time to indicate a constant state of torque using a knead and extrude test evaluation device (manufactured by Toyo Seiki Seisaku-sho Ltd., LABO PLASTOMILL) under conditions of a rotation speed of 30 rpm, a test temperature of 150° C., and 60 g of the vinyl chloride resin composition.

<Sheet Gloss>

As an index of the gloss, the sheet gloss of the molded product of the vinyl chloride resin composition was measured.

To 100 parts by weight of a vinyl chloride resin (A) (manufactured by Kaneka Corporation, product name: Kanevinyl (registered trademark) S-1008, average polymerization degree of 800), 1 part by weight of a processing aid (B), 1.0 part by weight of a butyl tin mercapto stabilizer (manufactured by NITTO KASEI CO., LTD.: TVS #1380), 0.5 parts by weight of an internal lubricant (manufactured by Emery Oleo Chemicals, product name: GH4), and 0.4 parts by weight of an external lubricant (manufactured by Emery Oleo Chemicals, product name: G70S) were mixed in a state of powder. A resultant mixture was kneaded using 8 inch test roll (manufactured by KANSAI ROLL Co. Ltd., test roll) under conditions of a rotation speed of 18 rpm at a temperature of 203° C. for 2 minutes, to prepare a sheet having a thickness of 0.3 cm. The gloss degree on the surface of a resultant sheet was visually evaluated according to the following criteria of 1 point to 5 points.

<Gloss Degree on Surface of Sheet>

5 points: an area of 100% of the whole sheet is gloss and transparent
4 points: an area of 80% of the whole sheet is gloss and transparent
3 points: an area of 50% of the whole sheet is gloss and transparent
2 points: an area of 20% of the whole sheet is gloss and transparent
1 point: the whole sheet is matt and opaque Example 1-1

Into a reactor equipped with a stirrer, 0.5 parts (parts by weight, the same applies hereafter) of sodium dioctylsuccinic acid and 0.0008 parts of ferrous sulfate (FeSO$_4$7H$_2$O) which were previously dissolved in water, 0.0032 parts of disodium ethylenediaminetetraacetate (EDTA), 0.06 parts of sodium formaldehyde sulfoxylate were charged, and further water was added to adjust an amount of water to 200 parts. While an inside of the reactor was substituted with nitrogen to remove oxygen in a space and water. Then, while a temperature of a mixture was increased to 60° C. with stirring, a mixture of the first polymer (b1) containing 15 parts of acrylonitrile, 65 parts of styrene, and 0.05 parts of t-butyl hydroperoxide was added continuously over 170 minutes to carry out polymerization. To this, at the time of 60 minutes and 120 minutes from the start of the continuous addition, 0.2 parts of sodium dodecylbenzene sulfonate was added. Additionally, a mixture of the second polymer (b2) containing 2 parts of acrylonitrile, 6 parts of styrene, 12 parts of butyl acrylate, and 0.05 parts of t-butyl hydroperoxide was added continuously over 50 minutes to carry out polymerization. After the addition of the copolymerization component was finished, stirring was continued for 1 hour or more while a temperature of the mixture was kept at 60° C. to complete the polymerization and to cool the mixture to obtain a latex of a processing aid (B1).

4 parts of calcium chloride diluted to 1% at a temperature of 25° C. was added to the obtained latex of processing aid (B1), and the resultant was coagulated and subjected to heat treatment, dehydration, washing and drying to obtain a powder of a processing aid (B1). Using the obtained processing aid (B1), each of physical properties of the vinyl chloride resin composition was evaluated. Results are shown in Table 1.

Example 1-2

A mixture of the second polymer (b2) containing 8 parts of methyl methacrylate, 12 parts of butyl acrylate, 0.05 parts of t-butyl hydroperoxide was added continuously over 50 minutes in the same manner as Example 1-1, to carry out polymerization. The subsequent continuous addition was carried out in the same manner as Example 1-1, to prepare a latex of a processing aid (B2) and then to prepare powder of the processing aid (B2) using the same powdering method as Example 1-1. Each of physical properties of the vinyl chloride resin composition containing the resultant processing aid (B2) was evaluated. Results are shown in Table 1.

Example 1-3

A mixture of the first polymer (b1) containing 13 parts of acrylonitrile, 65 parts of styrene, 2 parts of methyl methacrylate, 0.05 parts oft-butyl hydroperoxide was added continuously over 170 minutes in the same manner as Example 1-1, to carry out polymerization. The subsequent continuous addition was carried out in the same manner as Example 1-1, to prepare a latex of a processing aid (B3) and then prepare powder of the processing aid (B3) using the same powdering method as Example 1-1. Each of the physical properties of the vinyl chloride resin composition containing the resultant processing aid (B3) was evaluated. Results are shown in Table 1.

Comparative Example 1-1

In Comparative Example 1-1, styrene acrylonitrile copolymer (B4) (manufactured by GalataChemicals: Blendex869) was used. Each of physical properties of the vinyl chloride resin composition containing the processing aid (B4) was evaluated. Results are shown in Table 1.

An abbreviation described in Table 1 means the following compound.
AN: acrylonitrile
St: styrene
MMA: methylmethacrylate
BA: butylacrylate Comparative Example 1-2

Comparative Example 1-2 was carried out in the same manner as Example 1-1 except that a mixture of the first polymer (b1) containing 80 parts of methyl methacrylate, 0.05 parts of t-butyl hydroperoxide, a mixture of the second polymer (b2) containing 8 parts of methyl methacrylate, 12 parts of butyl acrylate, 0.05 parts oft-butyl hydroperoxide was used, to prepare a latex of a processing aid (B5) and then to prepare powder of the processing aid (B5) using the same powdering method as Example 1-1. Each of the physical properties of the vinyl chloride resin composition containing the resultant processing aid (B5) was evaluated. Results are shown in Table 1.

Example 2-3

A mixture of the first polymer (b1) containing 15 parts of acrylonitrile, 65 parts of styrene, 0.08 parts of t-butyl hydroperoxide and 0.15 parts of t-dodecyl mercaptan was added continuously over 170 minutes in the same manner as Example 1-1, to carry out polymerization. The subsequent

TABLE 1

|  |  |  |  | Example 1-1 B1 | Example 1-2 B2 | Example 1-3 B3 | Comparative Example 1-1 B4 | Comparative Example 1-2 B5 |
|---|---|---|---|---|---|---|---|---|
| Composition of processing aid (B) | Composition of first polymer (b1) | AN | % by weight | 18.8 | 18.8 | 16.3 | 20 |  |
|  |  | St | % by weight | 81.2 | 81.2 | 81.2 | 80 |  |
|  |  | BA | % by weight |  |  | 2.5 |  |  |
|  |  | MMA | % by weight |  |  |  |  | 100 |
|  |  | (b1) Glass transition temperature(Tg)(° C.) | | 103.6 | 103.6 | 96.6 | 103.8 | 105 |
|  | Rate of first polymer (b1) | | % by weight | 80 | 80 | 80 | 100 | 80 |
|  | Composition of second polymer (b2) | AN | % by weight | 10 |  | 10 |  |  |
|  |  | St | % by weight | 30 |  | 30 |  |  |
|  |  | BA | % by weight | 60 | 60 | 60 |  | 60 |
|  |  | MMA | % by weight |  | 40 |  |  | 40 |
|  |  | (b2) Glass transition temperature(Tg)(° C.) | | −9.7 | −9.7 | −9.7 | — | −9.7 |
|  | Rate of second polymer (b2) | | % by weight | 20 | 20 | 20 | 0 | 20 |
|  |  | Tg (b1) − Tg (b2)(° C.) | | 113 | 113 | 106 |  | 115 |
| Physical property of processing aid (B) | Weight average molecular weight | | Mw | 1,020,000 | 879,000 | 958,000 | 2,860,000 | 1,000,000 |
|  | Volume average particle diameter | | μm | 0.142 | 0.116 | 0.202 | — | 0.090 |
| Physical property of vinyl chloride resin composition |  | HAZE | | 5.9 | 6.6 | 6.1 | 5.4 | 6.9 |
|  | Total light transmittance | | T % | 86.4 | 85.9 | 85.9 | 84.6 | 83.1 |
|  |  | YI | | 22.5 | 20.0 | 22.5 | 28.4 | 15.4 |
|  | Fish eye | | Number | 0 | 6 | 4 | >10000 | 448 |
|  | Gelation rate | | Minute:second | 1:03 | 1:01 | 1:04 | 2:57 | 2:16 |
|  |  | Sheet gloss | | 5 points | 5 points | 5 points | 5 points | 5 points |

From the results of Table 1, the vinyl chloride resin compositions of Examples 1-1 to 1-3 had excellent workability, surface property, and gloss relative to those of Comparative Examples 1-1 to 1-2.

Example 2-1

A mixture of the first polymer (b1) containing 15 parts of acrylonitrile, 65 parts of styrene, 0.08 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B6) and then to prepare powder of the processing aid (B6) using the same powdering method as Example 1-1. Each of physical properties of the vinyl chloride resin composition containing the resultant processing aid (B6) was evaluated. Results are shown in Table 2.

Example 2-2

A mixture of the first polymer (b1) containing 15 parts of acrylonitrile, 65 parts of styrene, 0.08 parts of t-butyl hydroperoxide and 0.2 parts of t-dodecyl mercaptan was added continuously over 170 minutes in the same manner as Example 1-1, to carry out polymerization. The subsequent continuous addition was carried out in the same manner as Example 1-1, to prepare a latex of a processing aid (B7) and then to prepare powder of the processing aid (B7) using the same powdering method as Example 1-1. Each of the physical properties of the vinyl chloride resin composition containing the resultant processing aid (B7) was evaluated. Results are shown in Table 2.

continuous addition was carried out in the same manner as Example 1-1, to prepare a latex of a processing aid (B8) and then to prepare powder of the processing aid (B8) using the same powdering method as Example 1-1. Each of the physical properties of the vinyl chloride resin composition containing the resultant processing aid (B8) was evaluated. Results are shown in Table 2.

Example 2-4

A mixture of the first polymer (b1) containing 15 parts of acrylonitrile, 65 parts of styrene, 0.01 parts of t-butyl hydroperoxide and 0.15 parts of t-dodecyl mercaptan was added continuously over 170 minutes in the same manner as Example 1-1, to carry out polymerization. The subsequent continuous addition was carried out in the same manner as Example 1-1, to prepare a latex of a processing aid (B9) and then to prepare powder of the processing aid (B9) using the same powdering method as Example 1-1. Each of the physical properties of the vinyl chloride resin composition containing the resultant processing aid (B9) was evaluated. Results are shown in Table 2.

Example 2-5

A mixture of the first polymer (b1) containing 15 parts of acrylonitrile, 65 parts of styrene, 0.001 parts of t-butyl hydroperoxide and 0.15 parts of t-dodecyl mercaptan was added continuously over 170 minutes in the same manner as Example 1-1, to carry out polymerization. The subsequent continuous addition was carried out in the same manner as Example 1-1, to prepare a latex of a processing aid (B10) and then to prepare powder of the processing aid (B10) using the same powdering method as Example 1-1. Each of the physical properties of the vinyl chloride resin composition containing the resultant processing aid (B10) was evaluated. Results are shown in Table 2.

Comparative Example 2-1

A mixture of the first polymer (b1) containing 15 parts of acrylonitrile, 65 parts of styrene, 0.1 parts oft-butyl hydroperoxide and 0.5 parts of t-dodecyl mercaptan was added continuously over 170 minutes in the same manner as Example 1-1, to carry out polymerization. The subsequent continuous addition was carried out in the same manner as Example 1-1, to prepare a latex of a processing aid (B11) and then to prepare powder of the processing aid (B11) using the same powdering method as Example 1-1. Each of the physical properties of the vinyl chloride resin composition containing the resultant processing aid (B11) was evaluated. Results are shown in Table 2.

addition was carried out in the same manner as Example 1-1, to prepare a latex of a processing aid (B12) and then to prepare powder of the processing aid (B12) using the same powdering method as Example 1-1. Each of the physical properties of the vinyl chloride resin composition containing the resultant processing aid (B12) was evaluated. Results are shown in Table 3.

Example 3-2

A mixture of the first polymer (b1) containing 15 parts of acylonitrile, 50 parts of styrene, 15 parts of butyl acrylate, and 0.05 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B13) and then to prepare powder of the processing aid (B13) using the same powdering method as Example 1-1. Each of the physical

TABLE 2

|  |  |  |  | Example 1-1 B1 | Example 2-1 B6 | Example 2-2 B7 | Example 2-3 B8 | Example 2-4 B9 | Example 2-5 B10 | Comparative Example 2-1 B11 |
|---|---|---|---|---|---|---|---|---|---|---|
| Composition of processing aid (B) | Composition of first polymer (b1) | AN | % by weight | 18.8 | 18.8 | 18.8 | 18.8 | 18.8 | 18.8 | 18.8 |
|  |  | St | % by weight | 81.2 | 81.2 | 81.2 | 81.2 | 81.2 | 81.2 | 81.2 |
|  |  | BA | % by weight |  |  |  |  |  |  |  |
|  |  | MMA | % by weight |  |  |  |  |  |  |  |
|  | (b1) Glass transition temperature(Tg)(° C.) |  |  | 103.6 | 103.6 | 103.6 | 103.6 | 103.6 | 103.6 | 103.6 |
|  | Rate of first polymer (b1) |  | % by weight | 80 | 80 | 80 | 80 | 80 | 80 | 80 |
|  | Composition of second polymer (b2) | AN | % by weight | 10 | 10 | 10 | 10 | 10 | 10 | 10 |
|  |  | St | % by weight | 30 | 30 | 30 | 30 | 30 | 30 | 30 |
|  |  | BA | % by weight | 60 | 60 | 60 | 60 | 60 |  | 60 |
|  |  | MMA | % by weight | 20 | 20 | 20 | 20 | 20 | 20 | 20 |
|  | (b2) Glass transition temperature(Tg)(° C.) |  |  | −9.7 | −9.7 | −9.7 | −9.7 | −9.7 | −9.7 | −9.7 |
|  | Rate of second polymer (b2) |  | % by weight | 20 | 20 | 20 | 20 | 20 | 20 | 20 |
|  | Tg (b1) − Tg (b2)(° C.) |  |  | 113 | 113 | 113 | 113 | 113 | 113 | 113 |
| Physical property of processing aid (B) | Weight average molecular weight |  | Mw | 1,020,000 | 560,000 | 148,574 | 312,000 | 1,660,000 | 3,840,000 | 85,000 |
|  | Volume average particle diameter |  | μm | 0.142 | 0.117 | 0.112 | 0.125 | 0.160 | 0.198 | 0.113 |
| Physical property of vinyl chloride resin composition | HAZE |  |  | 5.9 | 6.8 | 5.8 | 5.3 | 6.5 | 6.2 | 4.8 |
|  | Total light transmittance |  | T % | 86.4 | 85.7 | 86.0 | 86.2 | 85.3 | 85.2 | 86.5 |
|  | YI |  |  | 22.5 | 22.1 | 21.9 | 22.0 | 23.5 | 24.5 | 22.4 |
|  | Fish eye |  | Number | 0 | 1 | 0 | 1 | 1 | 0 | 0 |
|  | Gelation rate |  | Minute:second | 1:03 | 1:03 | 0:58 | 1:06 | 1:30 | 1:51 | 0:56 |
|  | Sheet gloss |  |  | 5 points | 5 points | 3 points | 4 points | 5 points | 5 points | 1 point |

From the results of Table 2, in the case where the processing aid had a weight average molecular weight of 100,000 to 4,000,000 as in Examples 2-1 to 2-5, vinyl chloride resin compositions had decreased fish eye, high gelation rate and excellent sheet gloss. On the other hand, Comparative Example 2-1 containing the processing aid of low molecular weight indicated that sheet gloss was insufficient, and Examples 2-4 to 2-5 containing the processing aid of high molecular weight indicated that the gelation rate was decreased due to insufficient dispersibility.

Example 3-1

A mixture of the first polymer (b1) containing 15 parts of acrylonitrile, 55 parts of styrene, 10 parts of butyl acrylate, and 0.05 parts of t-butyl hydroperoxide was added continuously over 170 minutes in the same manner as Example 1-1, to carry out polymerization. The subsequent continuous properties of the vinyl chloride resin composition containing the resultant processing aid (B13) was evaluated. Results are shown in Table 3.

Example 3-3

A mixture of the first polymer (b1) containing 15 parts of acylonitrile, 45 parts of styrene, 20 parts of butyl acrylate, and 0.05 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B14) and then to prepare powder of the processing aid (B14) using the same powdering method as Example 1-1. Each of the physical properties of the vinyl chloride resin composition containing the resultant processing aid (B14) was evaluated. Results are shown in Table 3.

Example 3-4

A mixture of the first polymer (b1) containing 15 parts of acrylonitrile, 40 parts of styrene, 25 parts of butyl acrylate, and 0.05 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B15) and then to prepare powder of the processing aid (B15) using the same powdering method as Example 1-1. Each of the physical properties of the vinyl chloride resin composition containing the resultant processing aid (B15) was evaluated. Results are shown in Table 3.

Comparative Example 3-1

A mixture of the first polymer (b1) containing 15 parts of acrylonitrile, 25 parts of styrene, 40 parts of butyl acrylate, and 0.05 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B16) and then to prepare powder of the processing aid (B16) using the same powdering method as Example 1-1. Each of the physical properties of the vinyl chloride resin composition containing the resultant processing aid (B16) was evaluated. Results are shown in Table 3.

and 0.05 parts of t-butyl hydroperoxide was added continuously over 50 minutes in the same manner as Example 1-1, to carry out polymerization. The subsequent continuous addition was carried out in the same manner as Example 1-1, to prepare a latex of a processing aid (B17) and then to prepare powder of the processing aid (B17) using the same powdering method as Example 1-1. Each of the physical properties of the vinyl chloride resin composition containing the resultant processing aid (B17) was evaluated. Results are shown in Table 4.

Example 4-2

A mixture of the second polymer (b2) containing 1 part of acrylonitrile, 3 parts of styrene, 16 parts of butyl acrylate, and 0.05 parts of t-butyl hydroperoxide was added continuously over 50 minutes in the same manner as Example 1-1, to carry out polymerization. The subsequent continuous addition was carried out in the same manner as Example 1-1, to prepare a latex of a processing aid (B18) and then to prepare powder of the processing aid (B18) using the same powdering method as Example 1-1. Each of the physical properties of the vinyl chloride resin composition containing the resultant processing aid (B18) was evaluated. Results are shown in Table 4.

Comparative Example 4-1

A mixture of the second polymer (b2) containing 5 parts of acrylonitrile, 15 parts of styrene, and 0.05 parts oft-butyl

TABLE 3

| | | | | Example 1-1 B1 | Example 3-1 B12 | Example 3-2 B13 | Example 3-3 B14 | Example 3-4 B15 | Comparative Example 3-1 B16 |
|---|---|---|---|---|---|---|---|---|---|
| Composition of processing aid (B) | Composition of first polymer (b1) | AN | % by weight | 18.8 | 18.8 | 18.8 | 18.8 | 18.8 | 18.8 |
| | | St | % by weight | 81.2 | 68.7 | 62.4 | 56.2 | 50 | 31.2 |
| | | BA | % by weight | | 12.5 | 18.8 | 25 | 31.2 | 50 |
| | | MMA | % by weight | | | | | | |
| | | (b1) Glass transition temperature(Tg)(° C.) | | 103.6 | 72.9 | 59.4 | 46.8 | 35.2 | 4.9 |
| | Rate of first polymer (b1) | | % by weight | 80 | 80 | 80 | 80 | 80 | 80 |
| | Composition of second polymer (b2) | AN | % by weight | 10 | 10 | 10 | 10 | 10 | 10 |
| | | St | % by weight | 30 | 30 | 30 | 30 | 30 | 30 |
| | | BA | % by weight | 60 | 60 | 60 | 60 | 60 | 60 |
| | | MMA | % by weight | | | | | | |
| | | (b2) Glass transition temperature(Tg)(° C.) | | −9.7 | −9.7 | −9.7 | −9.7 | −9.7 | −9.7 |
| | Rate of second polymer (b2) | | % by weight | 20 | 20 | 20 | 20 | 20 | 20 |
| | Tg (b1) − Tg (b2)(° C.) | | | 113 | 83 | 69 | 57 | 45 | 15 |
| Physical property of processing aid (B) | Weight average molecular weight | | Mw | 1,020,000 | 918,000 | 937,000 | 947,000 | 888,000 | 1,174,000 |
| | Volume average particle diameter | | μm | 0.142 | 0.112 | 0.111 | 0.115 | 0.110 | 0.104 |
| Physical property of vinyl chloride resin composition | HAZE | | | 5.9 | 5.0 | 5.2 | 4.7 | 5.5 | 5.6 |
| | Total light transmittance | | T % | 86.4 | 87.5 | 87.3 | 87.4 | 85.4 | 85.6 |
| | YI | | | 22.5 | 17.7 | 17.6 | 17.4 | 21.3 | 20.3 |
| | Fish eye | | Number | 0 | 1 | 0 | 0 | 1 | 0 |
| | Gelation rate | | Minute:second | 1:03 | 1:08 | 0:52 | 0:49 | 0:46 | 0:36 |
| | Sheet gloss | | | 5 points | 5 points | 4 points | 3 points | 3 points | 1 point |

From the results of Table 3, in the case where first polymers as in Examples 3-1 to 3-4 had a higher Tg than a given Tg, vinyl chloride resin compositions had decreased fish eye, high gelation rate, and excellent sheet gloss. On the other hand, when the first polymers had lower Tg, the sheet gloss became insufficient due to poor melt viscoelasticity.

Example 4-1

A mixture of the second polymer (b2) containing 3 parts of acrylonitrile, 9 parts of styrene, 8 parts of butyl acrylate, hydroperoxide was added continuously over 50 minutes in the same manner as Example 1-1, to carry out polymerization. The subsequent continuous addition was carried out in the same manner as Example 1-1, to prepare a latex of a processing aid (B19) and then to prepare powder of the processing aid (B19) using the same powdering method as Example 1-1. Each of the physical properties of the vinyl chloride resin composition containing the resultant processing aid (B19) was evaluated. Results are shown in Table 4.

Comparative Example 4-2

A mixture of the second polymer (b2) containing 4 parts of acrylonitrile, 12 parts of styrene, 4 parts of butyl acrylate, and 0.05 parts of t-butyl hydroperoxide was added continuously over 50 minutes in the same manner as Example 1-1, to carry out polymerization. The subsequent continuous addition was carried out in the same manner as Example 1-1, to prepare a latex of a processing aid (B20) and then to prepare powder of the processing aid (B20) using the same powdering method as Example 1-1. Each of the physical properties of the vinyl chloride resin composition containing the resultant processing aid (B20) was evaluated. Results are shown in Table 4.

Comparative Example 4-3

A mixture of the second polymer (b2) containing 20 parts of butyl acrylate, and 0.05 parts of t-butyl hydroperoxide was added continuously over 50 minutes in the same manner as Example 1-1, to carry out polymerization. The subsequent continuous addition was carried out in the same manner as Example 1-1, to prepare a latex of a processing aid (B21) and then to prepare powder of the processing aid (B21) using the same powdering method as Example 1-1. Each of the physical properties of the vinyl chloride resin composition containing the resultant processing aid (B21) was evaluated. Results are shown in Table 4.

Example 5-1

A mixture of the first polymer (b1) containing 12 parts of acrylonitrile, 68 parts of styrene, and 0.05 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B22) and then to prepare powder of the processing aid (B22) using the same powdering method as Example 1-1. Each of the physical properties of the vinyl chloride resin composition containing the resultant processing aid (B22) was evaluated. Results are shown in Table 5.

Example 5-2

A mixture of the first polymer (b1) containing 20 parts of acrylonitrile, 60 parts of styrene, and 0.05 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B23) and then to prepare powder of the processing aid (B23) using the same powdering method as Example 1-1. Each of the physical properties of the vinyl chloride resin composition containing the resultant processing aid (B23) was evaluated. Results are shown in Table 5.

TABLE 4

| | | | | Example 1-1 B1 | Example 4-1 B17 | Example 4-2 B18 | Comparative Example 4-1 B19 | Comparative Example 4-2 B20 | Comparative Example 4-3 B21 |
|---|---|---|---|---|---|---|---|---|---|
| Composition of processing aid (B) | Composition of first polymer (b1) | AN | % by weight | 18.8 | 18.8 | 18.8 | 18.8 | 18.8 | 18.8 |
| | | St | % by weight | 81.2 | 81.2 | 81.2 | 81.2 | 81.2 | 81.2 |
| | | BA | % by weight | | | | | | |
| | | MMA | % by weight | | | | | | |
| | | (b1) Glass transition temperature (Tg)(° C.) | | 103.6 | 103.6 | 103.6 | 103.6 | 103.6 | 103.6 |
| | Rate of first polymer (b1) | | % by weight | 80 | 80 | 80 | 80 | 80 | 80 |
| | Composition of second polymer (b2) | AN | % by weight | 10 | 15 | 5 | 25 | 20 | |
| | | St | % by weight | 30 | 45 | 15 | 75 | 60 | |
| | | BA | % by weight | 60 | 40 | 80 | | 20 | 100 |
| | | MMA | % by weight | | | | | | |
| | | (b2) Glass transition temperature (Tg)(° C.) | | −9.7 | 19.9 | −33.9 | 104.8 | 57 | −54 |
| | Rate of second polymer (b2) | | % by weight | 20 | 20 | 20 | 20 | 20 | 20 |
| | Tg (b1) − Tg (b2)(° C.) | | | 113 | 84 | 138 | −1 | 47 | 158 |
| Physical property of processing aid (B) | Weight average molecular weight | | Mw | 1,020,000 | 1,013,000 | 996,000 | 908,000 | 931,000 | 878,000 |
| | Volume average particle diameter | | μm | 0.142 | 0.126 | 0.116 | 0.123 | 0.121 | 0.114 |
| Physical property of vinyl chloride resin composition | HAZE | | | 5.9 | 6.3 | 6.13 | 6.6 | 6.4 | 5.96 |
| | Total light transmittance | | T % | 86.4 | 86.4 | 86.50 | 85.3 | 86.3 | 86.51 |
| | YI | | | 22.5 | 22.4 | 20.73 | 25.4 | 22.5 | 19.44 |
| | Fish eye | | Number | 0 | 169 | 24 | >10000 | >10000 | 1 |
| | Gelation rate | | Minute:second | 1:03 | 1:07 | 1:38 | 4:42 | 1:10 | 2:50 |
| | Sheet gloss | | | 5 points | 5 points | 4 points | 5 points | 4 points | 1 point |

From the results of Table 4, in the case where second polymers as in Examples 4-1 and 4-2 had a given Tg range, vinyl chloride resin compositions had decreased fish eye, high gelation rate, and excellent sheet gloss. On the other hand, when defined second polymers had lower Tg, sheet gloss became insufficient due to poor melt viscoelasticity, so that the gelation rate became slow due to high lubricity. In addition, in the case of the second polymer having higher Tg than a given Tg range, the number of fish eye was increased due to insufficient dispersibility.

Comparative Example 5-1

A mixture of the first polymer (b1) containing 8 parts of acrylonitile, 72 parts of styrene, and 0.05 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B24) and then to prepare powder of the processing aid (B24) using the same powdering method as Example 1-1. Each of the physical properties of the vinyl chloride resin composition containing the resultant processing aid (B24) was evaluated. Results are shown in Table 5.

Comparative Example 5-2

A mixture of the first polymer (b1) containing 24 parts of acrylonitrile, 56 parts of styrene, and 0.05 parts of t-butyl hydroperoxide was added continuously over 170 minutes in the same manner as Example 1-1, to carry out polymerization. The subsequent continuous addition was carried out in the same manner as Example 1-1, to prepare a latex of a processing aid (B25) and then to prepare powder of the processing aid (B25) using the same powdering method as Example 1-1. Each of the physical properties of the vinyl chloride resin composition containing the resultant processing aid (B25) was evaluated. Results are shown in Table 5.

TABLE 5

|  |  |  |  | Example 1-1 B1 | Example 5-1 B22 | Example 5-2 B23 | Comparative Example 5-1 B24 | Comparative Example 5-2 B25 |
|---|---|---|---|---|---|---|---|---|
| Composition of processing aid (B) | Composition of first polymer (b1) | AN | % by weight | 18.8 | 15 | 25 | 10 | 30 |
|  |  | St | % by weight | 81.2 | 85 | 75 | 90 | 70 |
|  |  | BA | % by weight |  |  |  |  |  |
|  |  | MMA | % by weight |  |  |  |  |  |
|  | (b1) Glass transition temperature (Tg)(° C.) |  |  | 103.6 | 102.9 | 104.8 | 101.9 | 105.8 |
|  | Rate of first polymer (b1) |  | % by weight | 80 | 80 | 80 | 80 | 80 |
|  | Composition of second polymer (b2) | AN | % by weight | 10 | 10 | 10 | 10 | 10 |
|  |  | St | % by weight | 30 | 30 | 30 | 30 | 30 |
|  |  | BA | % by weight | 60 | 60 | 60 | 60 | 60 |
|  |  | MMA | % by weight |  |  |  |  |  |
|  | (b2) Glass transition temperature (Tg)(° C.) |  |  | −9.7 | −9.7 | −9.7 | −9.7 | −9.7 |
|  | Rate of second polymer (b2) |  | % by weight | 20 | 20 | 20 | 20 | 20 |
|  | Tg (b1) − (b2)(° C.) |  |  | 113 | 113 | 115 | 112 | 116 |
| Physical property of processing aid (B) | Weight average molecular weight | Mw |  | 1,020,000 | 890,000 | 977,000 | 890,000 | 1,048,000 |
|  | Volume average particle diameter | μm |  | 0.142 | 0.119 | 0.115 | 0.117 | 0.115 |
| Physical property of vinyl chloride resin composition | HAZE |  |  | 5.9 | 6.3 | 5.3 | 13.6 | 6.0 |
|  | Total light transmittance | T % |  | 86.4 | 85.8 | 86.9 | 70.9 | 85.2 |
|  | YI |  |  | 22.5 | 23.9 | 21.6 | 39.4 | 27.4 |
|  | Fish eye | Number |  | 0 | 31 | 104 | 2 | >10000 |
|  | Gelation rate | Minute:second |  | 1:03 | 1:02 | 1:03 | 1:04 | 1:01 |
|  | Sheet gloss |  |  | 5 points | 3 points | 5 points | 1 point | 4 points |

From the results of Table 5, in the case where first polymers (b1) as in Examples 5-1 and 5-2 had a given copolymer composition, vinyl chloride resin compositions had decreased fish eye, high gelation rate, and excellent sheet gloss. On the other hand, when a composition of a defined compound was out of a given range, the physical properties of the vinyl chloride resin composition became insufficient in the viewpoint of the compatibility to the vinyl chloride resin. In addition, when an amount of an aromatic vinyl compound is increased, the transparency and the color tone of the vinyl chloride resin composition became insufficient due to the increase of a yellow component.

Therefore, one or more embodiments of the present invention sufficiently satisfies the transparency and the color tone of the vinyl chloride resin composition, and greatly improves properties of the fish eye and the gelation rate which occur in a conventional processing aid composed of a copolymer containing vinyl cyanide compound-aromatic vinyl compound.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A vinyl chloride resin composition comprising: 100 parts by weight of a vinyl chloride resin (A); and 0.1 to 20 parts by weight of a processing aid (B), wherein
the processing aid (B) comprises 50 to 95% by weight of a first polymer (b1) and 5 to 50% by weight of a second polymer (b2) and has a weight average molecular weight of 100,000 to 1,500,000, and wherein
the first polymer (b1) has Tg of 5 to 110° C. and is polymerized with 12 to 28% by weight of a vinyl cyanide compound, 32 to 88% by weight of an aromatic vinyl compound, 0 to 40% by weight of an alkyl acrylate, and 0 to 30% by weight of other vinyl compound copolymerizable with the vinyl cyanide compound, the aromatic vinyl compound, and the alkyl acrylate, per 100% by weight of the first polymer (b1),
the second polymer (b2) has Tg of −40 to 50° C., and
the first polymer (b1) has Tg of 40° C. or higher than Tg of the second polymer (b2).

2. The vinyl chloride resin composition according to claim 1, wherein the processing aid (B) has the weight average molecular weight of 500,000 to 1,500,000.

3. The vinyl chloride resin composition according to claim 1, wherein the second polymer (b2) is polymerized with 30 to 90% by weight of an alkyl acrylate, 10 to 70% by weight of at least one vinyl compound selected from the group consisting of a vinyl cyanide compound, an aromatic vinyl compound, and an alkyl methacrylate, and 0 to 30% by weight of other vinyl compound copolymerizable with the alkyl acrylate, the vinyl cyanide compound, the aromatic vinyl compound, and the alkyl methacrylate, per 100% by weight of the second polymer (b2).

4. The vinyl chloride resin composition according to claim 1, wherein the first polymer (b1) has Tg of 50 to 105° C.

5. The vinyl chloride resin composition according to claim 1, wherein the second polymer (b2) has Tg of −20 to 30° C.

6. The vinyl chloride resin composition according to claim 1, wherein the first polymer (b1) is polymerized with 16 to 24% by weight of the vinyl cyanide compound, 56 to 84% by weight of the aromatic vinyl compound, 0 to 20% by weight of the alkyl acrylate, and 0 to 30% by weight of other vinyl compound copolymerizable with the vinyl cyanide compound, the aromatic vinyl compound, and the alkyl acrylate, per 100% by weight of the first polymer (b1).

7. The vinyl chloride resin composition according to claim 1, wherein the processing aid (B) comprises 70 to 90% by weight of the first polymer (b1) and 10 to 30% by weight of the second polymer (b2).

8. The vinyl chloride resin composition according to claim 1, wherein the first polymer (b1) has a weight average molecular weight of 600,000 to 1,500,000.

9. The vinyl chloride resin composition according to claim 1, wherein the first polymer (b1) is polymerized with 12 to 28% by weight of the vinyl cyanide compound, 50 to 80% by weight of the aromatic vinyl compound, 8 to 35% by weight of the alkyl acrylate, and 0 to 30% by weight of other vinyl compound copolymerizable with the vinyl cyanide compound, the aromatic vinyl compound, and the alkyl acrylate, per 100% by weight of the first polymer (b1).

10. A molded product, obtained by molding the vinyl chloride resin composition according to claim 1.

11. The vinyl chloride resin composition according to claim 2, wherein the second polymer (b2) is polymerized with 30 to 90% by weight of an alkyl acrylate, 10 to 70% by weight of at least one vinyl compound selected from the group consisting of a vinyl cyanide compound, an aromatic vinyl compound, and an alkyl methacrylate, and 0 to 30% by weight of other vinyl compound copolymerizable with the alkyl acrylate, the vinyl cyanide compound, the aromatic vinyl compound, and the alkyl methacrylate, per 100% by weight of the second polymer (b2).

12. The vinyl chloride resin composition according to claim 2, wherein the first polymer (b1) has Tg of 50 to 105° C.

13. The vinyl chloride resin composition according to claim 3, wherein the first polymer (b1) has Tg of 50 to 105° C.

14. The vinyl chloride resin composition according to claim 2, wherein the second polymer (b2) has Tg of −20 to 30° C.

15. The vinyl chloride resin composition according to claim 3, wherein the second polymer (b2) has Tg of −20 to 30° C.

16. The vinyl chloride resin composition according to claim 2, wherein the first polymer (b1) is polymerized with 16 to 24% by weight of the vinyl cyanide compound, 56 to 84% by weight of the aromatic vinyl compound, 0 to 20% by weight of the alkyl acrylate, and 0 to 30% by weight of other vinyl compound copolymerizable with the vinyl cyanide compound, the aromatic vinyl compound, and the alkyl acrylate, per 100% by weight of the first polymer (b1).

17. The vinyl chloride resin composition according to claim 3, wherein the first polymer (b1) is polymerized with 16 to 24% by weight of the vinyl cyanide compound, 56 to 84% by weight of the aromatic vinyl compound, 0 to 20% by weight of the alkyl acrylate, and 0 to 30% by weight of other vinyl compound copolymerizable with the vinyl cyanide compound, the aromatic vinyl compound, and the alkyl acrylate, per 100% by weight of the first polymer (b1).

18. The vinyl chloride resin composition according to claim 1, wherein the first polymer (b1) is not chemically bonded with the second polymer (b2).

19. The vinyl chloride resin composition according to claim 1, wherein the processing aid (B) has a volume average particle diameter of from 0.100 μm to 0.500 μm.

20. A molded product, obtained by molding the vinyl chloride resin composition according to claim 2.

21. The vinyl chloride resin composition according to claim 1, wherein the second polymer (b2) is polymerized with 50 to 90% by weight of an alkyl acrylate, 10 to 50% by weight of at least one vinyl compound selected from the group consisting of a vinyl cyanide compound, an aromatic vinyl compound, and an alkyl methacrylate, and 0 to 30% by weight of other vinyl compound copolymerizable with the alkyl acrylate, the vinyl cyanide compound, the aromatic vinyl compound, and the alkyl methacrylate, per 100% by weight of the second polymer (b2).

* * * * *